UNITED STATES PATENT OFFICE.

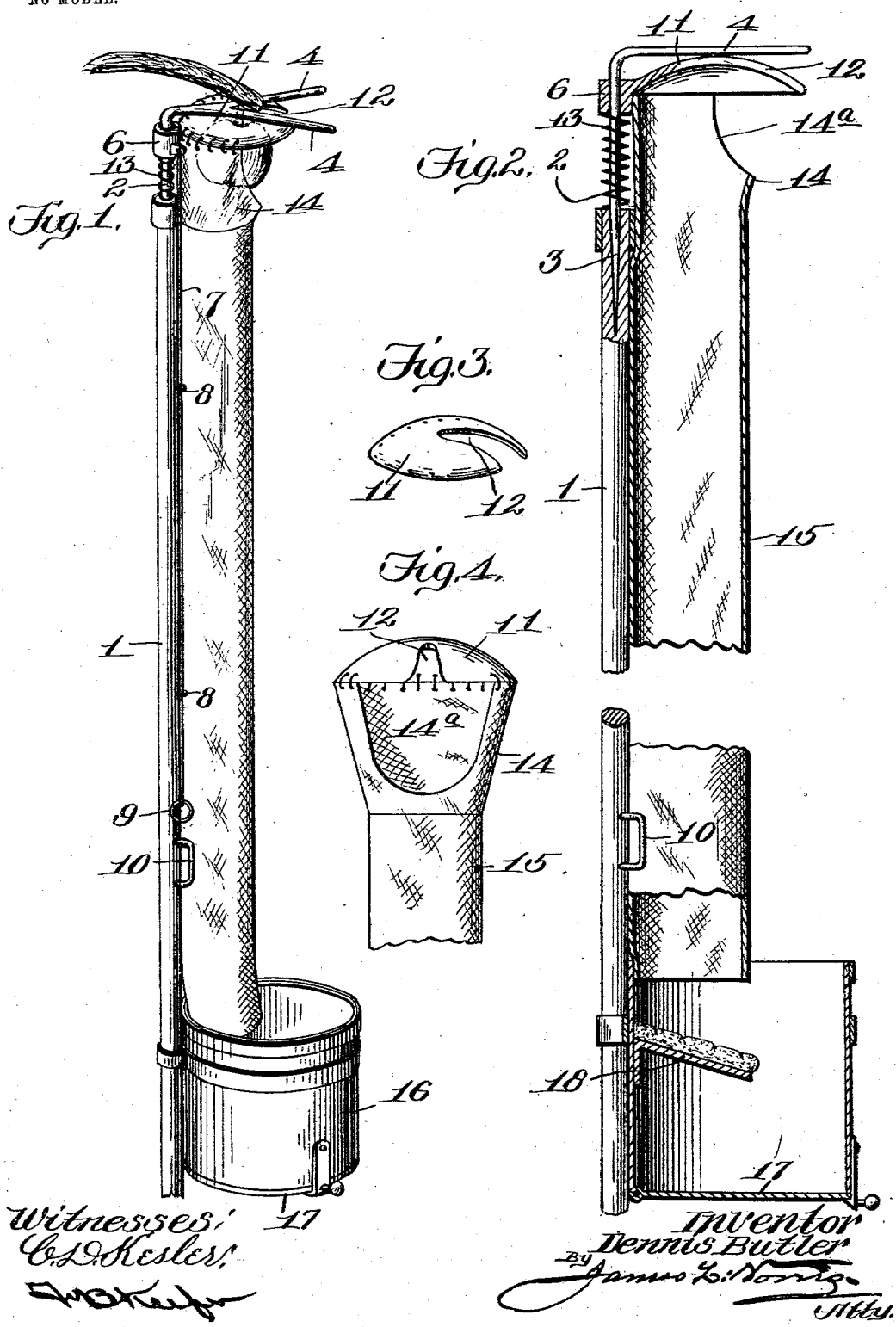

DENNIS BUTLER, OF WATSON, ILLINOIS.

FRUIT-PICKER.

SPECIFICATION forming part of Letters Patent No. 721,013, dated February 17, 1903.

Application filed December 17, 1902. Serial No. 135,586. (No model.)

*To all whom it may concern:*

Be it known that I, DENNIS BUTLER, a citizen of the United States, residing at Watson, in the county of Effingham and State of Illinois, have invented new and useful Improvements in Fruit-Pickers, of which the following is a specification.

This invention relates to fruit-pickers, and especially to that class of fruit-pickers which comprise a rod or staff carrying a receptacle for fruit and provided at its upper end with picking mechanism for separating the fruit from the branches of the tree and also with mechanism for conveying the fruit as it is gathered to the receptacle. The present invention has for its object to provide improved mechanism for gathering the fruit and improved means for preventing the fruit from being bruised as it is discharged into the receptacle.

It also has for its object to provide a picker of the class described which will be simple and economical in construction and efficient in operation and which may be operated with exceeding ease.

To these ends my invention consists in the features and in the construction, combination, and arrangement of parts hereinafter described, reference being had to the accompanying drawings, forming a part of this specification, wherein—

Figure 1 is a perspective view of my improved picker. Fig. 2 is a longitudinal sectional view of the top and bottom part of the device; and Fig. 3 is a detail perspective view, on an enlarged scale, of the fruit-clasp.

Referring to the drawings, the numeral 1 indicates the staff, which may conveniently consist of a wooden pole of any desired length. Fitted in the upper end of the pole is an iron rod 2, which may be conveniently attached to the staff by sharpening the lower end of said rod, as at 3, and driving such sharpened or pointed end firmly into the end of the staff. The upper end of the rod 2 is bent laterally or at a right angle and terminates in two tapered and pointed tines 4, constituting a fork. Movably arranged on the rod 2 is a sleeve 6, to which is attached one end of a wire 7, said wire passing through guide-eyes 8, attached to the staff and terminating in a ring 9. Fixed in the staff beneath the ring 9 is a broad staple 10 sufficiently large to permit the operator passing the fingers of one of his hands through the bail when he grasps the staff. Fixed to the collar 6 is a concavo-convex cap or clasp 11, provided on its outer side with a slot 12, which extends from the center of said cap or clasp to and through the perimeter thereof. The cap or clasp 11 is substantially of the shape of an inverted saucer and may be connected to the sleeve 6 in any suitable manner, and its center is disposed directly beneath the junction of the two tines of the fork. Arranged on the rod 2 is a coiled spring 13, which bears at its lower end against the upper end of the staff and at its upper end bears against the under side of the sleeve 6, said spring operating to maintain the sleeve and the cap or clasp connected thereto in an elevated position. Secured to the edge of the cap 11 is a funnel-shaped receiver 14, to the lower end of which is attached a tube 15, formed of canvas or other suitable flexible material. Said funnel-shaped receiver is attached in any suitable manner to the edge of the cap 11, in the present instance it being shown secured to said cap by means of a piece of twine, which is threaded through perforations formed in the edges of the cap and through the upper edge of the receiver. The funnel-shaped receiver 14 is provided on one side with an aperture $14^a$ of a size sufficient to receive an apple, said aperture being formed in vertical alinement with the fork and the slot 12. The tube 15 is glued throughout its length to the staff 1. Attached to the lower end portion of the staff 1 is a basket 16, having a hinged bottom 17. The lower end of the conveyer-tube 15 is inserted in and discharges into the upper end of the basket, and fitted in said basket immediately beneath the lower end of the conveyer-tube is an inclined shelf 18, which is padded on its upper side for a purpose presently made apparent. As before stated the coiled spring 13 operates to keep the saucer-shaped cap or clasp held against the under side of the fork 4.

The operation of my improved fruit-picker is as follows: The operator grasps the staff with one hand at a point beneath the basket and inserts the fingers of his other hand through the staple 10 and grasps the staff and he inserts the thumb of the same hand through the ring 9 on the bottom of the wire 7. He then slides the fork, the slitted saucer-shaped cap, and the apertured funnel-shaped receiver over the fruit—such as an apple, for example—in such manner that the cap will rest upon the top of the apple and the fork will grasp the smaller part of the stem and bear against the branch to which the stem is attached. Then by pulling down the ring 9 by means of his thumb the sleeve and its attached cap or clasp will also be drawn down and detach the fruit, the fork holding the branch stationary during such operation. By providing the staple 10 the hand of the operator while the thumb is engaged in pulling down the wire is prevented from slipping on the staff. When the stem of the apple is separated in the manner described, the apple drops into the receiver 14 and from the latter drops down through the tube 15 into the basket. As it enters the basket it drops upon the padded and inclined shelf 18, whereby the fruit is prevented from being bruised, and it rolls off from said shelf down into the basket. When the basket becomes full, the hinged bottom 17 may be opened and the fruit permitted to drop into a suitable receptacle provided for the purpose.

Having described my invention, what I claim is—

1. In a fruit-picker, a staff, a laterally-projecting fork arranged on the upper end of the staff, a laterally-projecting cap arranged beneath the fork and movable toward and from the latter, said cap having approximately the shape of an inverted saucer, and slotted from its center to its outer edge, means for normally holding the cap in proximity to the fork, and means for drawing said cap away from the fork, substantially as described.

2. In a fruit-picker, a staff, a rod fitted at its lower end to the staff and provided at its upper end with a laterally-projecting cap arranged beneath the fork and movable on said rod toward and from the fork, the said cap having approximately the shape of an inverted saucer and slotted from its center to its outer edge, means for normally holding the cap in proximity to the fork, and means for drawing said cap away from the fork, substantially as described.

3. In a fruit-picker, a staff, a rod fitted at its lower end to the staff and provided at its upper end with a laterally-projecting fork, a sleeve movable on the rod between the staff and fork, a laterally-projecting cap attached to said sleeve, said cap having approximately the shape of an inverted saucer and slotted from its center to its outer edge, a spring arranged on the rod for normally holding the cap beneath the fork in close proximity to the latter, and means for drawing said cap away from the fork, substantially as described.

4. In a fruit-picker, a staff, a rod fitted at its lower end to the staff and provided at its upper end with a laterally-projecting fork, a sleeve arranged on the rod and movable thereon between the staff and fork, a cap fixed at one edge to said sleeve and having approximately the shape of an inverted saucer, said cap being slotted from its center to its outer edge, a coiled spring arranged on the rod between the staff and said sleeve for holding the cap in close proximity to the fork, and a flexible connection attached to said sleeve for moving the cap away from the fork, substantially as described.

5. In a fruit-picker, a staff, a rod fitted at its lower end to the staff and provided at its upper end with a laterally-projecting fork, a sleeve movable on the rod between the staff and the fork, a cap arranged beneath the fork and attached at one edge to said sleeve, said cap having approximately the shape of an inverted saucer and slotted from its center to its outer edge, a spring arranged on the rod between the staff and sleeve for normally holding the cap in proximity to the fork, and a flexible connection attached to said sleeve for drawing the cap away from the fork, substantially as described.

6. In a fruit-picker, a staff, a rod fitted at its lower end to the staff and provided at its upper end with a laterally-projecting fork, a sleeve movable on the rod between the staff and the fork, a laterally-projecting cap arranged beneath the fork and attached at one end to said sleeve, a spring arranged on the fork between the staff and the sleeve and operating to hold said cap beneath the fork, said cap having approximately the shape of an inverted saucer and slotted from its center to its outer edge, a flexible connection attached to the sleeve for drawing the cap away from the fork, a fruit-receptacle fixed to the lower portion of the staff, and a tubular conveyer connected at one end with said receptacle and attached at its upper end to the edge of said cap and apertured to receive the fruit, substantially as described.

7. In a fruit-picker, a staff, a rod fitted at its lower end to the staff and provided at its upper end with a laterally-projecting fork, a sleeve movable on the rod between the staff and the fork, a coiled spring arranged on the rod between the staff and the sleeve for holding said sleeve elevated, a cap attached at one edge to said sleeve and projecting laterally beneath the fork, said cap having approximately the shape of an inverted saucer and slotted from its center to its outer edge, a flexible connection attached to said sleeve for drawing said cap away from the fork, a fruit-receptacle attached to the lower end portion of the staff, a conveyer for conveying the picked fruit to said receptacle, and a padded inclined shelf arranged transversely in the receptacle against which the fruit drops as it is discharged into the receptacle, substantially as described.

8. In a fruit-picker, a staff, a rod fitted at its lower end to the staff and provided at its upper end with a laterally-projecting fork, a sleeve movable on the rod between the staff and fork, a coiled spring arranged on the rod to hold the sleeve elevated, a cap attached at one edge to said sleeve and projecting laterally beneath the fork, said cap having approximately the shape of an inverted saucer and slotted from its center to its outer edge, a flexible connection attached to said sleeve for drawing said cap away from the fork and provided at its lower end with a loop, and a staple attached to the staff in proximity to said ring and constituting a hand-guard, substantially as described.

9. In a fruit-picker, a staff, a rod fitted at its lower end to the staff and provided at its upper end with a laterally-projecting fork, a sleeve movable on the rod between the staff and the fork, a coiled spring arranged on the rod between the staff and the sleeve for holding said sleeve elevated, a cap attached at one edge to said sleeve and projecting laterally beneath the fork, said cap having approximately the shape of an inverted saucer and slotted from its center to its outer edge, a flexible connection attached to said sleeve for drawing said cap away from the fork, a fruit-receptacle attached to the lower end portion of the staff and having a hinged bottom, and a conveyer for conveying the picked fruit to said receptacle, substantially as described.

10. In a fruit-picker, a staff, a laterally-projecting fork arranged on the upper end of the staff, a laterally-projecting cap arranged beneath the fork and movable toward and from the latter, said cap being slotted from its center to its outer edge, a fruit-receptacle mounted on the lower portion of the staff, a funnel-shaped receiver attached at its upper end to the edge of the cap and provided on one side with an aperture disposed beneath the slot in the cap, a flexible tube leading from said receiver to the fruit-receptacle, means for normally holding the cap in proximity to the fork, and means for drawing said cap away from the fork, substantially as described.

In testimony whereof I have hereunto set my hand in presence of two subscribing witnesses.

DENNIS BUTLER.

Witnesses:
A. C. LOY,
P. DONOVAN.